United States Patent [19]

Haslam

[11] Patent Number: 4,530,255

[45] Date of Patent: Jul. 23, 1985

[54] ROTARY BALANCE MOTOR

[76] Inventor: James H. Haslam, 113 Southport New Rd., Tarleton, Near Preston, Lancashire, England

[21] Appl. No.: 585,633

[22] Filed: Mar. 8, 1984

Related U.S. Application Data

[63] Continuation of Ser. No. 145,103, Apr. 30, 1980, abandoned.

[30] Foreign Application Priority Data

May 1, 1979 [GB] United Kingdom ................ 7915142

[51] Int. Cl.³ ............................................. F16C 3/06
[52] U.S. Cl. ................................... 74/604; 123/192 B
[58] Field of Search ................ 74/589, 590, 591, 603, 74/604; 123/192 B, 192 R

[56] References Cited

U.S. PATENT DOCUMENTS

| 1,355,468 | 10/1920 | Goodrich | 74/589 |
| 1,566,486 | 12/1925 | Lee | 74/604 |
| 2,393,029 | 1/1946 | Eberhard | 74/603 |
| 2,568,576 | 9/1951 | Witzky et al. | 74/603 |
| 3,744,342 | 7/1973 | Kinoshita | 123/192 B |

FOREIGN PATENT DOCUMENTS

| 507584 | 9/1930 | Fed. Rep. of Germany | 74/604 |
| 231223 | 4/1925 | United Kingdom | 74/589 |

Primary Examiner—Kenneth J. Dorner
Attorney, Agent, or Firm—William A. Drucker

[57] ABSTRACT

This invention concerns balancing reciprocatory machines, such as internal combustion engines, in which reciprocating movement of a piston or the like is translated into rotation of a crankshaft via a connecting rod. In order to provide at least a significant degree of compensation or balancing of forces causing vibration in the machine, the crankpin has a pair of heart formations fixed thereon which makes rolling contact with a pair of rain drop formations rotatable on an extension of the connecting rod. At T.D.C. the point of each of the rain drop formations fits in the cusp of the appropriate heart formation and at B.D.C. the maximum radius of the heart formations coincide with the minimum radius of the rain drop formations.

13 Claims, 30 Drawing Figures

ROTARY BALANCE MOTOR

This application is a continuation of application Ser. No. 145,103, filed Apr. 30, 1980 and now abandoned.

This invention concerns balancing reciprocatory machines, such as internal combustion engines.

Two sources of vibration are inherent in translating reciprocating movement of a piston or the like into rotation of a crankshaft to which the piston is coupled by a connecting rod. One source is, of course the piston movement itself and attempts have been made previously to balance or compensate its effects using weights fixed on the crankshaft or parts associated therewith, or to use a sufficient number and configuration of cylinders and pistons and thus crankshaft throws, to give automatic balancing. Clearly, such forces are periodic at crankshaft speed. The other source is the angular movement of the connecting rod, which will, of course, also be periodic but at twice crankshaft speed.

In order to provide at least a significant degree of compensation or balancing of these primary and secondary forces it is proposed herein to provide a mass or weight movable periodically with movement of a connecting rod and relative to the connecting rod, conveniently as a rotating mass on an extension at its end remote from the piston or the like, which extension should generally be as light as possible.

Preferably this mass or weight is accelerated and decelerated in its periodic movement in a prescribed relation with the angular acceleration and deceleration of the connecting rod and is associated with and applies compensating forces to a part of the connecting rod or, and preferably, its crankshaft throw, or a part fixed relative thereto.

Such a rotating mass will have a prescribed shape and will normally mate with another wheel or formation of prescribed shape formed on the crankpin. The size, shape and weight of the said rotating mass depends on many factors, including the piston weight, connecting rod weight, and the L/R ratio (L is the length of the connecting rod from the centre of the piston pin to the centre of the crankpin and R is the radius of the crankshaft, i.e. from the centre of the main bearing to the centre of the crankpin). There are an infinite number of specific combinations of these factors, so that the precise form of the mass in terms of shape, size and weight will be subject to corresponding variation.

However, for most practical cases the shape of the formation on the crankpin could be a so-called heart shape with a point opposite a cusp, and that of the rotating wheel shape a so-called rain drop shape with a point opposite its position of minimum radius. This rain drop mass could have balance weights to ensure that it rotates on or near to its centre of gravity, and to increase its moment of inertia.

In order to accommodate the rotating mass, the crankshaft could have cut-outs or extra cranks incorporated in it.

The crankshafts, may be provided with balance weights to counterbalance the weight of the crankpin and heart formations and also the complete weight of the piston, connecting rod and rain drop assembly so that the centre of gravity of all the moving parts is on the centre line of the crankshaft.

In operation the point of the rain drop wheel engages the cusp of the heart wheel at T.D.C. (top dead centre) and the point of the heart wheel engages the position of minimum radius of the rain drop wheel at B.D.C. (bottom dead centre).

The shape of the formations and wheels means that the rotating weight accelerates from T.D.C. to B.D.C. and decelerates from B.D.C. to T.D.C. and the force developed opposes the angular motion of the connecting rod.

Rolling contact is normally made between the heart shaped formation and the rain drop wheel, but they could have gear teeth on the whole or part of their circumference. For the heart formation gear teeth will usually be provided on its circumference opposite its cusp and for the rain drop wheel on its side of minimum radius, so that the gear teeth will mesh at B.D.C.

Where gear teeth are not provided on all the circumference, the rotating mass could lose contact with the heart formation when the engine is being started or stopped and, to prevent or limit this, a retention plate in the crankcase would make contact with the rotating mass or rain drop wheel or a part fixed to it, such as a balance weight, and prevent it from moving more than a few degrees out of phase.

In order to minimise the size and weight of the connecting rod, the L/R ratio should be shorter. However, the problem is to design the rain drop wheels and their balance weights to have maximum possible inertia within reasonable size limits.

To overcome this problem the heart formation can be given a so called "negative" radius, so that at T.D.C. the cusp of the heart formation is above the centre of the crankpin. In practice, the heart formation will be in two halves, the halves being in parallel planes. The rain drop wheel will also be in two parts in parallel planes but each part will be a distorted rain drop shape and together will resemble a pair of calipers.

The heart and rain drop formations may be modified for practical purposes, for example the point of the rain drop wheel may be radiussed or broadened out for increased strength and the cusp of the heart formation may have an increased radius for ease of manufacture.

This invention will now be further described, by way of example only, with reference to the accompanying drawings in which:

FIG. 2B shows the same engine from the side with the crankshaft at 90°;

FIG. 3 shows an end view of the same engine at B.D.C.;

Referring to FIGS. 1 to 5 the engine has a piston 1 which reciprocates in a cylinder 2 and causes connecting rod 3 and its extension 6 to rotate on big end bearing 7. Crankshaft 4 rotates in main bearing 5. A pair of heart-shaped formations 8, are fixed on the crankshaft 4, and a pair of raindrop shaped wheels 9 are mounted on a hollow shaft 10 which rotates in bearing 11 and these raindrop wheels are provided with weights 13 to increase their moment of inertia and ensure that they rotate on the centre of gravity. The circumference of both heart and raindrop wheels is the same, and rolling contact is made between them with about one third of the circumference of each having gear teeth 16. The crankshaft 4 has two cut-outs (not shown) to accommodate balance weights 13 when the engine is at or near the T.D.C. position. The weight of the raindrop wheels and their balance weights is such that, assuming the piston to be a mass on the piston pin centre, the centre of gravity of the complete piston, connecting rod and raindrop wheels assembly is at or near to the centre of the crankpin. The crankshaft 4 is provided with balance weights 14 which counterbalance crankpin 15 and the complete piston 1, connecting rod 3 and raindrop wheel assembly, so that the centre of gravity of all the moving parts is on or near the centre line of the crankshaft. The cylinder 2 has cutouts (not shown) to accommodate heart formations 8.

Figure 1:
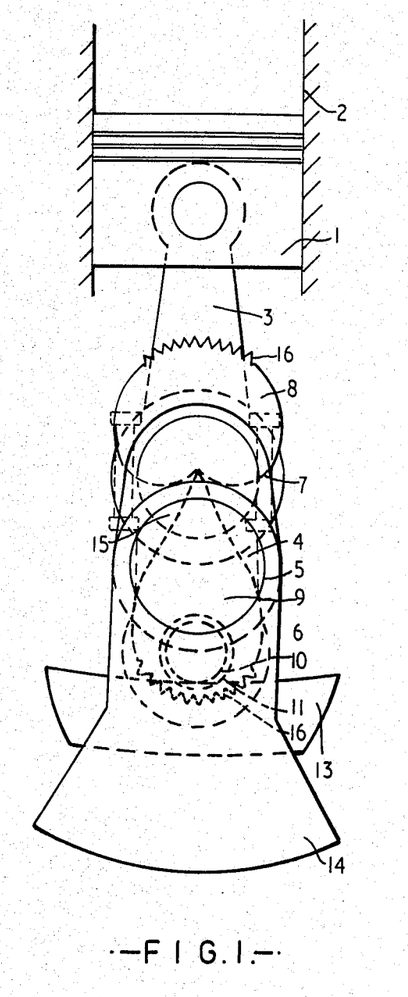
FIG. 1 shows a first embodiment an end view of a single cylinder engine at T.D.C.
Figure 2A:
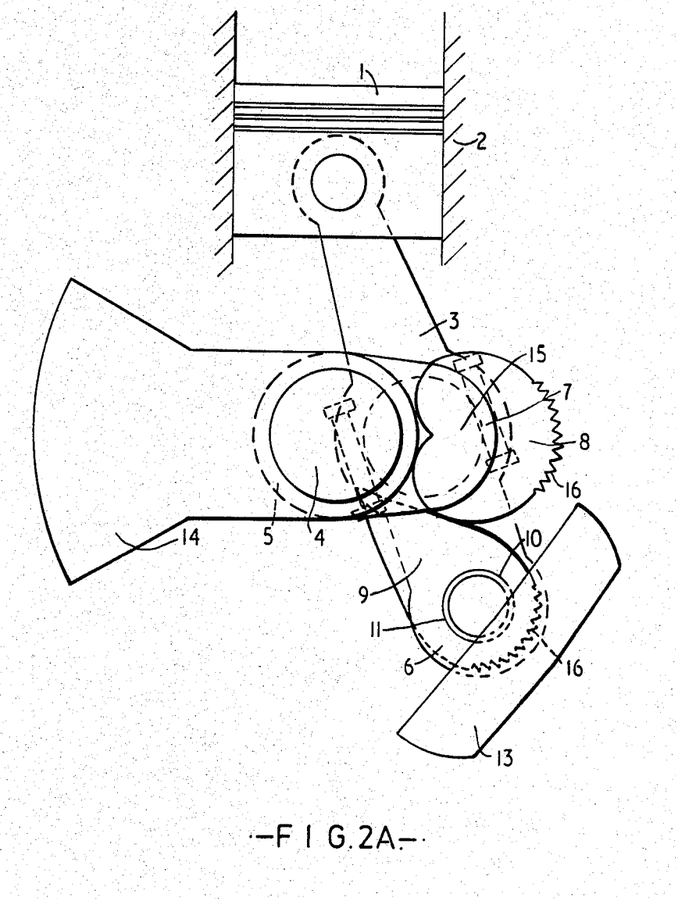
FIG. 2A shows an end view of the same engine but with the crankshaft at 90°.
Figure 4:
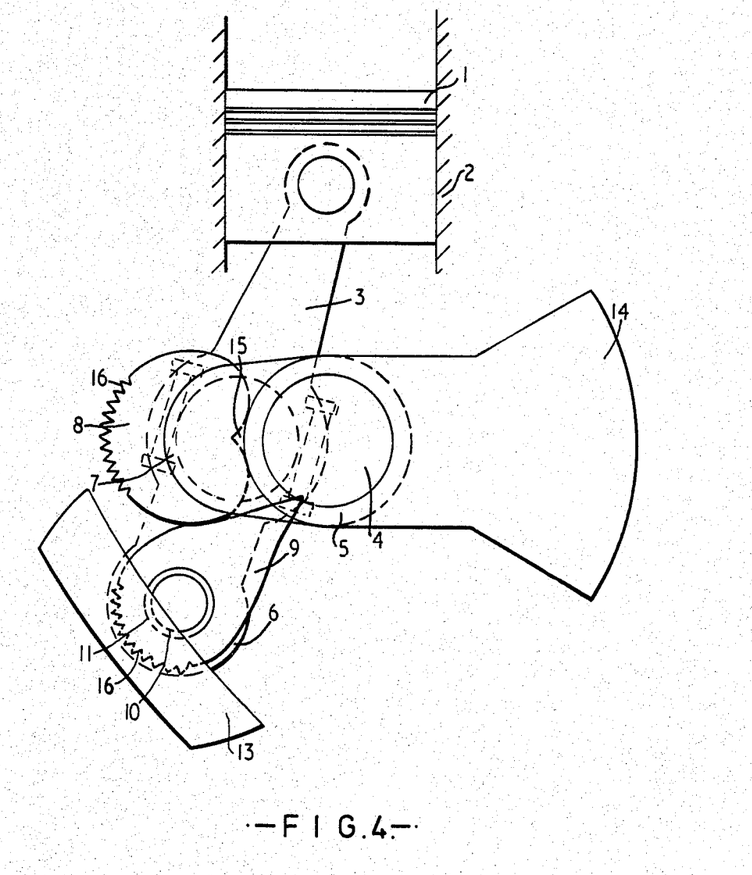
FIG. 4 shows an end view of the same engine with the crankshaft at 270°.
Figure 5:
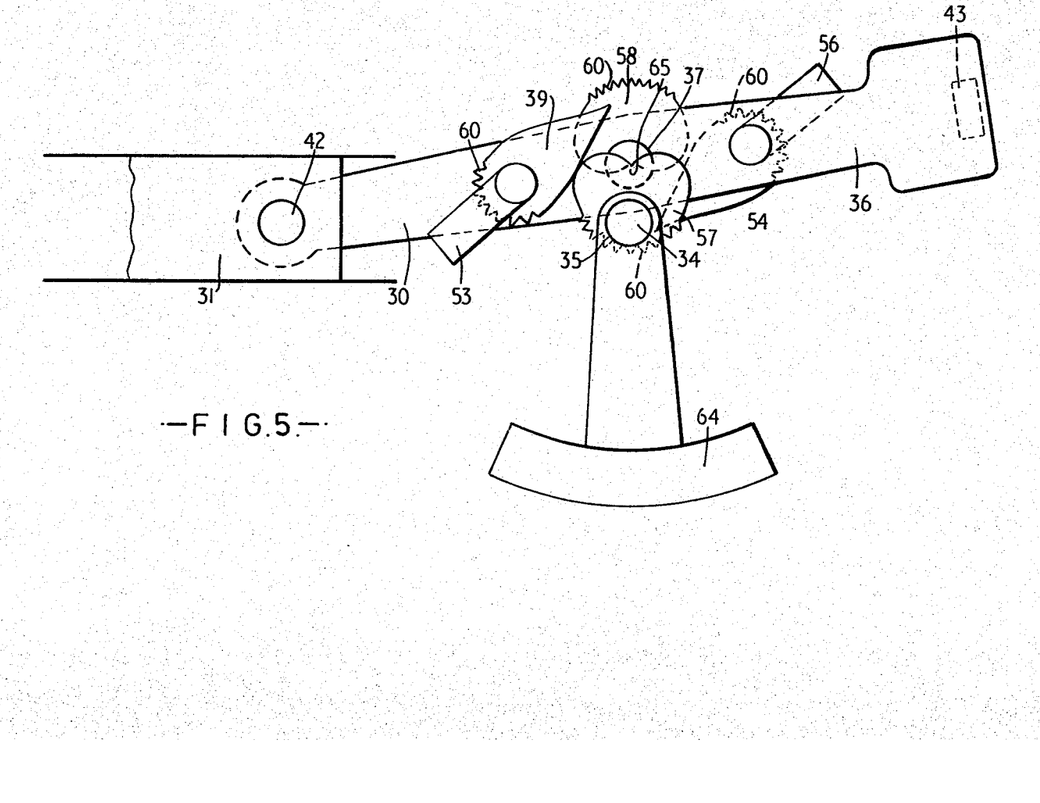
FIG. 5 shows for a second embodiment a side view of a sliding crank mechanism with the crankshaft at 90°.
Figure 6:
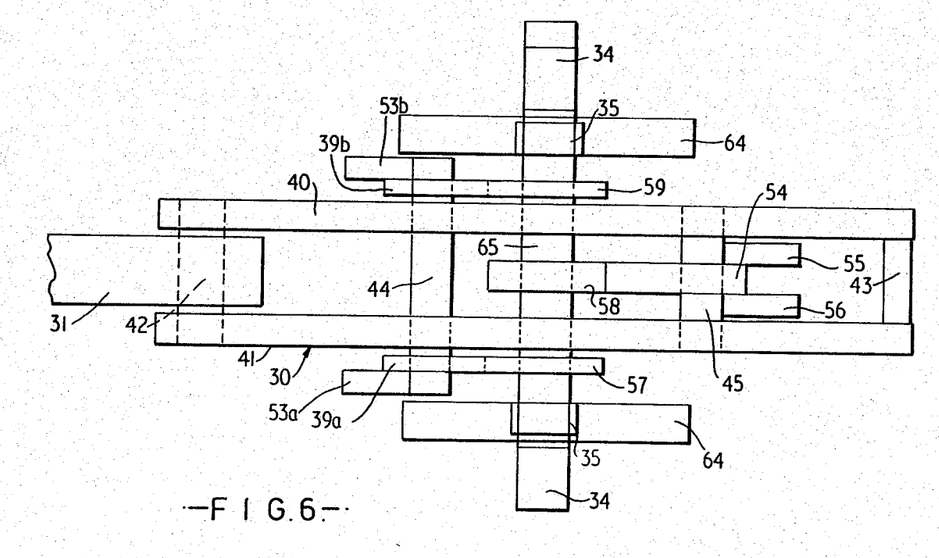
FIG. 6 shows the same mechanism from above.

Turning to FIGS. 5 and 6 a sliding crank mechanism having a long connecting rod 30 is shown. Part 31 represents a reciprocating part of a machine which causes the connecting rod 30 and its extension 36 to rotate on big end bearing 37 thus rotating crankshaft 34 on main bearing 35. The connecting rod 30 is in two parts 40, 41 separated by retaining pin 42 and a spacer 43 at its other end. A pair of shafts 44, 45 pass through the connecting rod parts 40, 41 and the first 44 carries on its ends rain drop formations 39a, b, mounted for rotation thereon and these rain drop formations are provided with weights 53a, b, respectively to increase their moment of inertia and ensure that they rotate on the centre of gravity. The second shaft 45 has rotatably mounted thereon, between the connecting rod parts 40, 41, a further rain drop formation 54 which is provided with a pair of weights 55, 56.

Three heart-shaped formations 57, 58, 59 are fixed on the crankshaft 34 one on either side of the connecting rod and one between the connecting rod parts for rolling contact with a corresponding rain drop formations. The heart shaped formations are provided with gear teeth 60 over about a third of their circumference opposite to their cusp and the rain drop formations also have a corresponding number gear teeth 60 opposite their points.

The crankshaft is provided with balance weights 64 which counter balance crankpin 65 and the machine part 31, connecting rod 30 and the rain drop wheel assembly, so that the centre of gravity of all the moving parts is on or near the centre line of the crankshaft.

The extension 36 serves as a balance weight to ensure that the centre of gravity of the mechanism is at or near the center of the crankpin.

The embodiment of FIGS. 5 and 6 operates in an analogous way to that of FIGS. 1 to 4 and, of course, cut-outs as necessary will be provided in the crankshaft and machine to accommodate the various moving parts.

To understand how the system works first imagine that the heart and rain drop formations do not exist and that the rain drop formations are replaced by a weight of equal mass in the centre of the rain drop formation bearing. With that arrangement the centre of gravity of the piston and connecting-rod assembly would also be on the centre of the crankpin, so the piston and connecting-rod assembly becomes a mass rotating on the crankpin which is balanced by the crankshaft balance weights, and this cancels out primary, secondary, teritary and quaternary harmonic forces. However, there would be an out of balance side thrust on the pistons, caused by the angular acceleration and deceleration of the connecting-rod, and the purpose of the heart and rain drop formations is to eliminate this.

It will be noted that at T.D.C. the connecting-rod begins its angular deceleration and assuming a clockwise rotation this gives a side thrust on the piston to the left, and at ninety degrees the connecting-rod begins its angular acceleration, also giving a side thrust to the left. At B.D.C. the connecting rod begins its angular deceleration and this gives a side thrust to the right, and at two hundred and seventy degrees it begins its angular acceleration, also giving a side thrust to the right.

It will also be noted that at T.D.C. the points of the rain drop formations fit into the cusps of the heart-shaped formations, and the rain drop formations are rotating at their minimum speed. From T.D.C. to B.D.C. the rain drop formations are accelerated by the heart formations and as they resist being accelerated they try to rotate the connecting-rod in the same direction as the crankshaft. The mass and inertia of the rain drop formations and the curvature of both heart and rain drop formations is such that the force applied to the connecting-rod balances the side thrust that would otherwise be applied to the piston. At B.D.C. the maximum radius of the heart formations co-incides with the minimum radius of the rain drop formations, and the rain drop formations are rotating at their maximum speed. From B.D.C. to T.D.C. the rain drop formations are decelerated by the heart formations and as they resist being decelerated they try to rotate the connecting-rod in the opposite direction to the crankshaft and again eliminate the side thrust on the piston.

Figure 23:
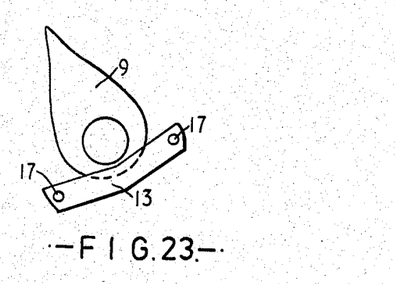
FIGS. 23 and 24 shows means for maintaining position of raindrop shaped parts.
Figure 24:
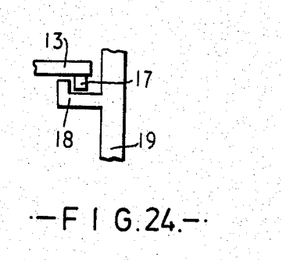

As gear teeth are used on only part of the formations, they could loose contact when the engine is being started or stopped. To prevent this part of the crankcase would be shaped so that there would be only a small clearance between it and the raindrop formations balance weights, or a part attached to them so that the raindrop formations would not move more than a few degrees out of phase. This is shown in FIGS. 23 and 24 wherein the weight 13 has lugs 17 which cooperate with an L-shaped flange 18 extending from the wall 19 of the crankcase.

It will be noted that during one revolution the connecting-rod has four cycles of deceleration, acceleration, deceleration, and acceleration, whereas the raindrop formations have two cycles of acceleration and deceleration. (The raindrop formations must accelerate and decelerate in proportion to the connecting rod) and yet must complete one revolution in the same time as the crankshaft does, so the acceleration and deceleration of the connecting rod must be multiplied by an exact multiplication factor, K, when it is applied to the raindrop formations. It is believed that the value of K is derived from the following equation when the heart wheel has a zero radius at T.D.C.

$$\frac{L}{R} - 1 = K$$

Thus the major problem is to design the raindrop formations and their balance weights to have the maximum possible inertia within the size limits imposed on them.

This problem and the law governing the value of K means that it becomes increasingly difficult to use shorter L/R ratios which are needed to keep the size and weight of the connecting-rod to a minimum.

Figure 11:
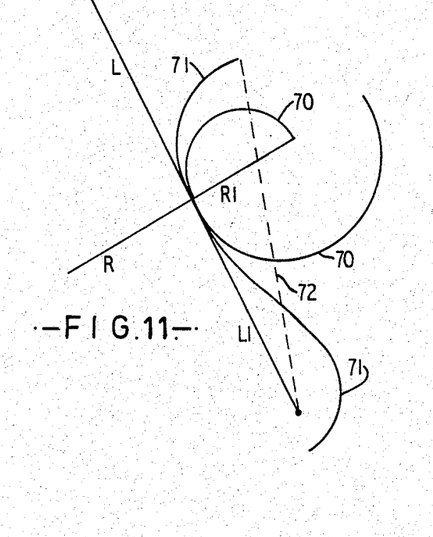
FIGS. 11 and 12 show theoretical heart and rain drop shapes.

To overcome this the heart formations can be given a negative radius, i.e. the cusp of the heart formation is placed above the centre of the crankpin when the engine is at T.D.C. The FIG. 11 shows the theoretical formations to give a negative radius where L=2R and the negative radius is such that the rain drop formations stop rotating at T.D.C. Unfortunately, this produces very complex curves with part of the heart formation 70 and a large part of the rain drop formation 71 going negative, the dotted line 72 is the centre line of the raindrop formation. This means that each formation must be in two sections in different planes and the theoretical shape has to be modified for about fifty degrees either side of T.D.C.

It is believed that the value of K for a negative radius is derived from the equation $$\frac{L}{R} = K \text{ when} \left\{ R + R1 = \frac{L + L1}{L/R} \right\}$$

R1 is the distance from the crankpin to the theoretical cusp of the heart formations, L1 is the distance from the centre of the crankpin to the centre of the raindrop wheel bearing, and the formula in the brackets means that the raindrop formation stops rotating at T.D.C.

However a more favourable wheel formation can be obtained by allowing the raindrop formation to rotate slightly at T.D.C. Such arrangements are shown in FIGS. 7 to 9 and 10 in which L=2R and the raindrop formation rotates at 1/10 crankshaft speed at T.D.C., giving a value for K of 1.8. With very short L/R ratios like this the formation size has to be scaled down so that the heart formation does not project too far into the cylinder.

Figure 7:
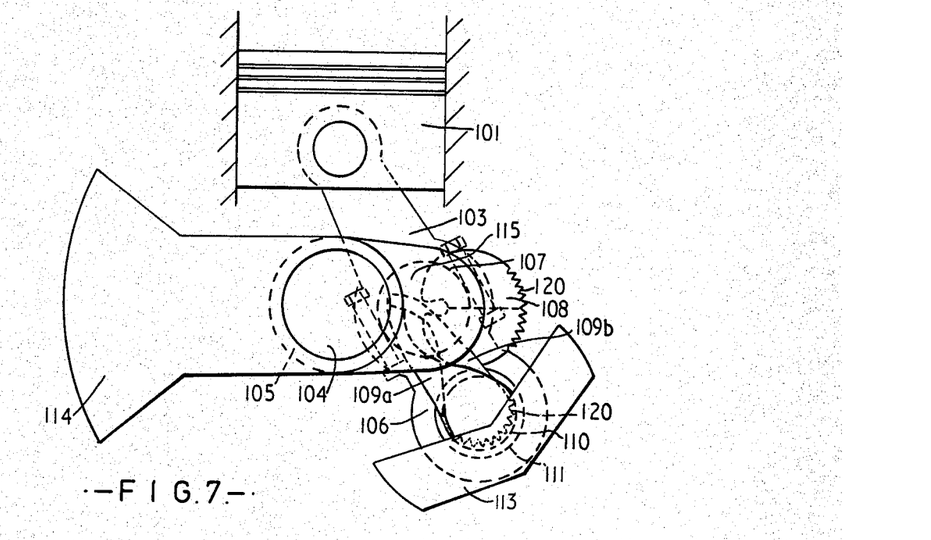
FIG. 7 shows for a third embodiment a single cylinder engine having a short con-rod and with the crankshaft at 90°.
Figure 8:
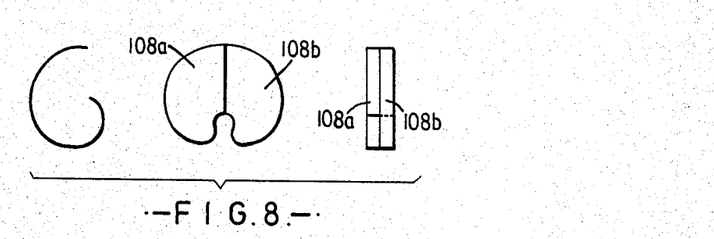
FIG. 8 shows the heart-shaped part of FIG. 7.
Figure 9:
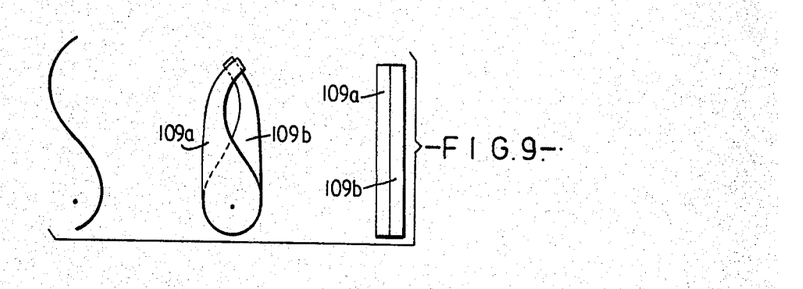
FIG. 9 shows the raindrop shaped part of FIG. 7.

Referring to FIGS. 7 to 9, crankshaft 104 rotates in main bearing 105, and the connecting rod 103 and its extension 106 rotate on big end bearing 107. A pair of heart shaped formations 108 (108a and b in FIG. 8) are provided on the crankshaft 104. The cusp point of the heart shaped formations is spaced from the centre of crankpin 115 for a so-called "negative" radius. A pair of distorted rain drop shaped wheels 109a and b (see FIG. 9) are mounted rotatably on each end of a hollow shaft 110 which rotates in bearing 111 and these rain drop wheels are provided with weights 113 to increase their moment of inertia and ensure that they rotate on the centre of gravity. The rain drop shapes are distorted so that their points are bent inwards, the two shapes together resembling a pair of calliper arms.

The crankshaft will have two cut-outs to accommodate the balance weights 113. The weight of the rain drop wheels and their balance weights is such that, assuming piston 101 to be a mass on the piston centre, the centre of gravity of the complete piston, connecting rod and rain drop wheels assembly is at or near to the centre of the crankpin. The crankshaft is provided with balance weights 114 which counterbalance the crankpin and the complete piston, connecting rod and rain drop wheel assembly so that the centre of gravity of all the moving parts is on or near the centre line of the crankshaft. The cylinder would have cut-outs (not shown on the drawings) to accommodate the heart formations 108a and b.

Figure 10:
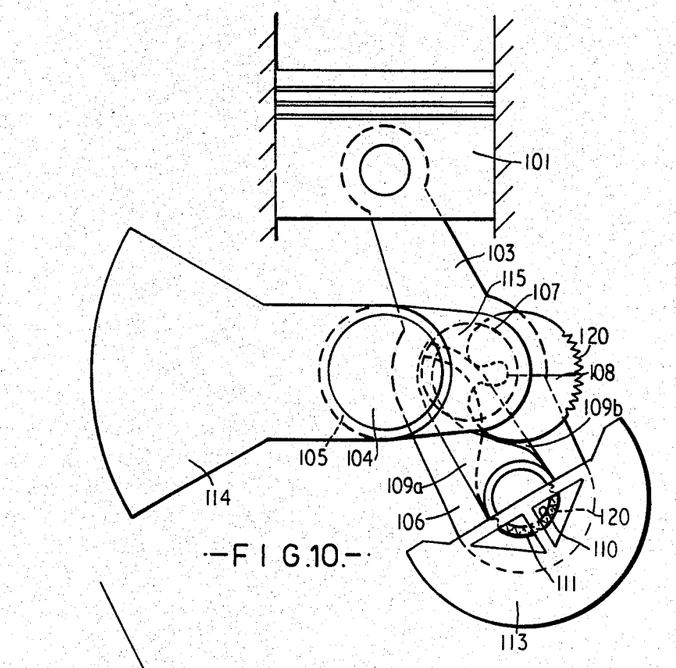
FIG. 10 shows for a fourth embodiment an end view of a single cylinder engine having an intermediate length con-rod and with the crankshaft at 90°.
Figures 13, 14, 15, 16, 17, 18, 19, 20, 21, 22:
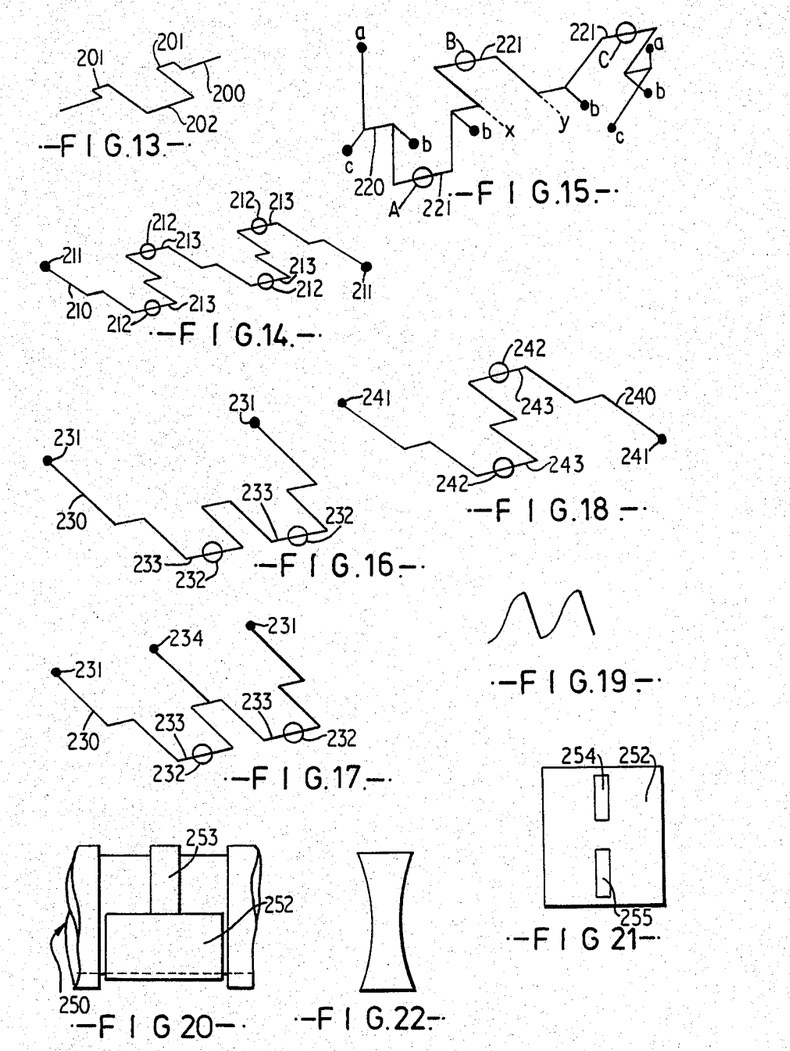
FIGS. 13 to 18 show schematically various preferred crankshaft arrangements and weightings.
FIG. 19 shows a preferred tooth formation for heart and raindrop shaped parts.
FIGS. 20 and 21 show parts of a preferred form of main bearing.
FIG. 22 shows and alternative form of main bearing.

The heart and rain drop shapes are shown having gear teeth 120 on at least their edges opposite their cusps and points respectively. Suitable teeth are shown in FIG. 19. The teeth are loaded in one direction only being inverted at the halfway point and for the heart formation radiate from the centre of the crankpin and for the raindrop formation from the centre of its bearing. FIGS. 8 and 9 show in turn, the theoretical shape, the practical shape derived therefrom, and sections of the heart and raindrop formations of FIG. 7. FIG. 10 shows a similar embodiment to that of FIG. 7 and like parts have been given the same reference numerals, so that detailed discussion of FIG. 10 will not be given. The main differences are in the shape of the balance weights 113 and the heart and raindrop shapes, although the latter are only slight.

Where the practical shape deviates from the theoretical shape sliding friction occurs, however gear teeth are needed on a similar proportion of the formations compared with zero radius shapes, and with shorter L/R ratios the acceleration and deceleration near to T.D.C. and B.D.C. is reduced, so frictional losses would probably be less than with a zero radius shape.

Figure 12:
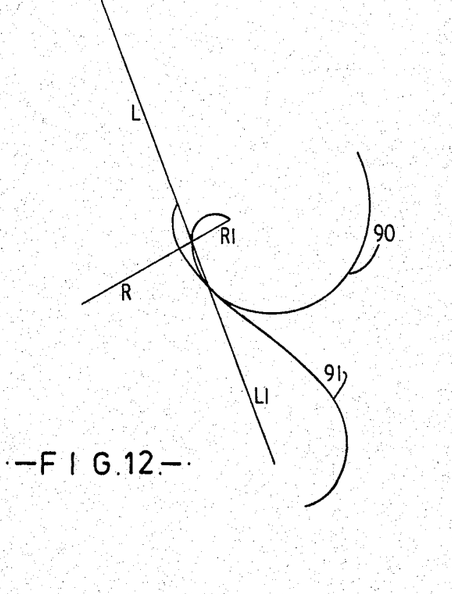

A further example of the theoretical heart 90 and raindrop 91 formations is shown in FIG. 12. Here L=2.5 R and the raindrop formation will rotate at 1/5 crankshaft speed at T.D.C. giving a value for K of 2, and it can be seen that this compromise gives much more favourable formations with only a small part of each being negative.

Figures 25, 26, 28:
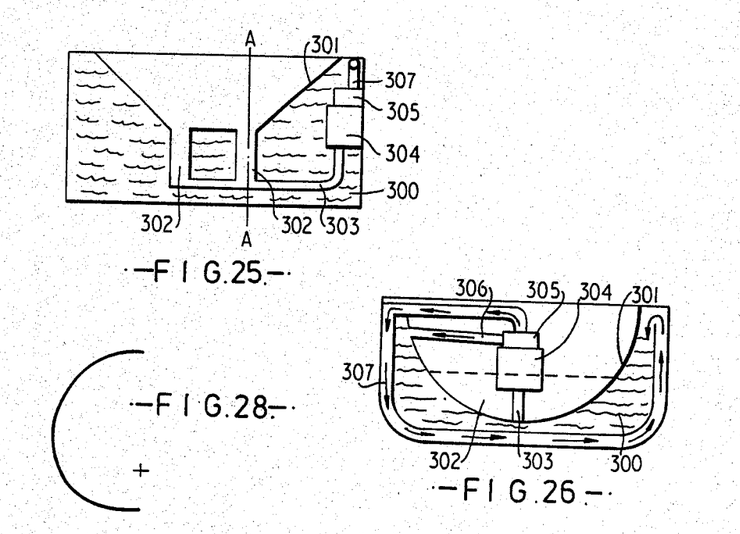
FIG. 25 shows a preferred sump arrangement.
FIG. 26 is a section along line AA of FIG. 25.
FIGS. 28 and 29 show further theoretical heart and raindrop shapes.
Figure 29:
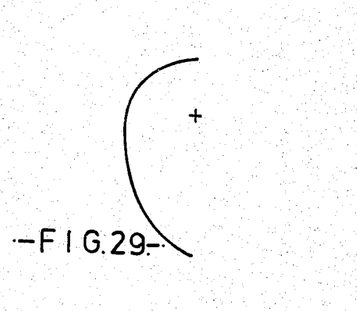

Theoretical heart and raindrop part shapes where the minimum radius of the heart formation is a positive radius are shown in FIGS. 28 and 29 respectively.

For negative radius wheel shapes where the raindrop formation rotates at T.D.C., and for positive radius heart formation shapes the multiplication factor K is believed to be derived from the overriding equation:

$$\frac{L}{R} - \left( \frac{\text{speed of raindrop formation at } T.D.C.}{\text{crankshaft speed}} \times \frac{L}{R} \right) = K$$

In general, the raindrop wheel could rotate on a suitable bearing, such as roller or needle bearing and the said roller bearing could have weights attached to it or its rollers, or be otherwise formed or adapted to increase its moment of inertia.

As an alternative to having large weights on the rotating raindrop wheels they could have a suitable coupling to some other periodically movable, usually rotating, mass, for example a gear wheel which drives another rotating weight with a suitable gear ratio. Other indirect couplings, such as chain-and-sprocket or belt types might also be used for this purpose, and a suitably modified shape of the heart formations and rain drop wheels might then be required. Epicyclic arrangements could also be devised.

A particular advantage of this engine design is that as the centre of gravity of the piston and connecting rod assembly is rotating on the crankpin, all these parts, including the piston are acting as flywheel weight, and as the crankshaft weights have a large radius they would have substantial inertia and little extra flywheel weight would be needed. In addition to this the energy to accelerate the raindrop formations is taken from the crankshaft during each power stroke, and returned to the crankshaft during each compression stroke, which would further help to smooth out the power impulses.

For a two cylinder engine the layout would be similar to that of a single cylinder engine. For a three cylinder engine the crankshaft would be the same as for a normal three cylinder engine, with weights added to the ends to ensure balance, and such counter-weights as could be accommodated nearer to the centre. For a four cylinder engine the arrangement would be that pistons numbers 1 and 3 would be at T.D.C. together, with pistons numbers 2 and 4 at B.D.C., as this would eliminate the need for counter-weights, except for one weight at each end, 180 degrees apart to ensure balance.

Crankshaft arrangements are shown in FIGS. 13 to 18.

FIG. 13 shows a crankshaft 200 for a single cylinder engine. The crankshaft 200 has cut-outs 201 on each side of crankpin 202 to accommodate rotation of balance weights.

In FIG. 14 a four cylinder engine crankshaft is shown. At each end of the crankshaft 210 are fixed weights 211 and circles 212 represent the combined mass of the piston, connecting rod and raindrop assemblies on each crankpin 213.

Referring to FIG. 15, a three cylinder engine crankshaft 220 is shown. Circles A, B and C represent the mass of the piston, connecting rod and raindrop assemblies on each crankpin 221. To reduce crankshaft stress, balance weights a, b and c are provided for each piston arrangement A, B and C respectively. The central piston arrangement B would normally have balance weights at x and y but because of the short L/R ratio the balance weights are needed at b.

FIG. 16 shows a crankshaft 230 for a twin cylinder engine in which the pistons reciprocate together. Fixed weights 231 are shown at each end of the crankshaft and circles 232 represent the combined mass of the piston, connecting rod and rain drop assemblies on each crankpin 233. As an alternative to FIG. 16, an additional fixed weight 234 can be added between the two crankpins, as shown in FIG. 17.

FIG. 18 shows a crankshaft 240 for a two stroke engine/compressor. Again fixed weights 241 are represented at each end of the crankshaft and the combined mass of the piston, connecting rod and raindrop assembly on each crankpin 243 represented by circles 242.

The crankshaft weights could be incorporated in the flywheel or used for other purposes, such as cooling fans and may have a torsional vibration damper interposed between them and the crankshaft. The crankshaft weight need not be symmetrical and could be at different spacings from the pistons and be of different weight.

Compared with a normal engine, the load on the crankpin bearing would be greater, needing a larger bearing, however the inertia load on the main bearings is eliminated altogether and these could be much smaller.

Referring to FIGS. 20 and 21, as there would be no upward load on the main bearing the upper part of these could be very narrow, and on both single and multi-cylinder engines could be as narrow as the metal between the cylinders, or could be shaped to follow the profile of the cylinder. This would allow the pistons to be inserted into the cylinders from the crankcase and give a good opportunity to use a fixed head design, and cast the cylinder head, cylinder, and upper part of the crankcase in one piece. As shown the main bearing 250 has a wide section 252 for half of its circumference and a narrow section 253 for the other half. FIG. 21 shows oil grooves 254, 255 in the inner surface of the wide section 252. As an alternative the upper section could be shaped as shown in FIG. 22. This would follow the shape of the metal between cylinders more closely.

To accomodate the shaped parts and balance weights, the crankcase and sump area will be larger than in a conventional engine and this could result in the lubricating oil being overcooled. To avoid this, the crankcase and sump could consist of an inner and outer section and the oil could be circulated between these sections preferably controlled by a thermostat.

One suitable sump arrangement is shown in FIGS. 25 and 26. The arrangement comprises a sump 300 and crankcase 301 which has extensions 302 for accommodating raindrop formations and/or rotating weights. Oil is returned to the sump from the crankcase via pipe 303 a pump 304, thermostat 305 and either directly via pipe 306 or via pipe 307 to allow the oil to cool.

Figure 27:
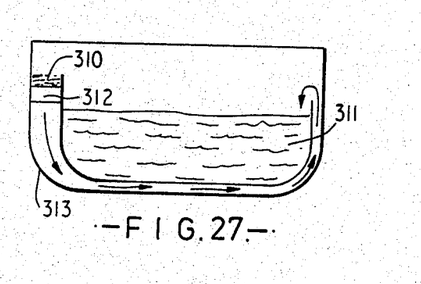
FIG. 27 is an alternative sump arrangement.

An alternative is shown in FIG. 27 in which oil is splashed by rotating engine parts into a well 310 and returns to sump 311 via a thermostatically operated valve 312 and pipe 313.

Embodiments of the invention are also suitable for any other type of piston machine, such as compressors or pumps, or any other machinery using a crank and reciprocating parts.

I claim:

1. A reciprocating machine of the type wherein reciprocating movement of a piston or the like is translated into rotation of a crankshaft via a connecting rod on a crankpin of the crankshaft, said connecting rod having a first bearing in which the crankpin is journaled, the connecting rod having an extension on its end remote from the piston and having a second bearing at the remote end of the extension and a mass or weight of a shape which mates with another formation on the crankpin and is rotatable on the second bearing on said extension so as to be movable periodically with movement of the connecting rod and relative to the connecting rod, said extension being a continuation of said connecting rod beyond said crankpin and the first bearing.

2. A machine as claimed in claim 1 wherein the formation on the crankpin is heart shaped with a cusp opposite a point.

3. A machine as claimed in claim 2 wherein the rotating mass is raindrop shaped with a point opposite its position of minimum radius.

4. A machine as claimed in claim 3, wherein the raindrop mass is provided with balance weights.

5. A machine as claimed in claim 4 wherein the raindrop mass is in two parts.

6. A machine as claimed in claim 3 wherein the heart formation has its cusp above the center of the crankpin at top dead center.

7. A machine as claimed in claim 6 wherein the heart formation is in two halves in parallel planes.

8. A machine as claimed in claim 2 wherein the heart formation has its cusp above the centre of the crankpin at top dead center.

9. A machine as claimed in claim 8 wherein the heart formation is in two halves in parallel planes.

10. A machine as claimed in claim 1 wherein the crankshaft is provided with balance weights.

11. A machine as claimed in claim 10 wherein the said formation has gear teeth over at least part of its circumference.

12. A machine as claimed in claim 11 wherein the gear teeth are positioned so as to mesh at and near bottom dead center.

13. A reciprocating machine of the type wherein reciprocating movement of a piston or the like is translated into rotation of a crankshaft via a connecting rod on a crankpin of the crankshaft, said connecting rod having a first bearing in which the crankpin is journaled, the connecting rod having an extension on its end remote from the piston and having a second bearing at the remote end of the extension and mass or weight rotatable on the second bearing on said extension so as to be movable periodically with movement of the connecting rod and relative to the connecting rod, said extension being a continuation of said connecting rod beyond said crankpin and the first bearing, wherein the rotatable mass has a prescribed shape and mates with another formation of prescribed shape on the crankpin.

* * * * *